(12) United States Patent
Noguchi

(10) Patent No.: US 6,234,639 B1
(45) Date of Patent: May 22, 2001

(54) POLARIZATION CONVERTER AND LIGHTING DEVICE FOR LCD PANEL

(75) Inventor: Masato Noguchi, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/332,988

(22) Filed: Jun. 15, 1999

(30) Foreign Application Priority Data

Jun. 15, 1998 (JP) .................................................. 10-166972

(51) Int. Cl.$^7$ ...................................................... F21V 8/00
(52) U.S. Cl. ................................................................ 362/31
(58) Field of Search ................................. 362/31, 560, 19

(56) References Cited

U.S. PATENT DOCUMENTS

| | | | |
|---|---|---|---|
| 5,671,994 | * 9/1997 | Tai et al. ............................. | 362/31 |
| 5,718,497 | * 2/1998 | Yokoyama et al. .................... | 362/31 |
| 5,764,322 | 6/1998 | Mamiya et al. ........................ | 349/65 |
| 5,899,552 | * 5/1999 | Yokoyama et al. .................... | 362/31 |

* cited by examiner

Primary Examiner—Laura K. Tso
(74) Attorney, Agent, or Firm—Greenblum & Bernstein, P.L.C.

(57) ABSTRACT

A polarization converter having a planar light guide element is disclosed, in which at least one of front and rear surfaces thereof defines a light emission surface and one edge surface defines an initial edge surface for unpolarized light, and at least one corrugated reflection boundary surface being provided in the light guide element. The reflection boundary surface is defined by at least two adjacent optical media having different refractive indexes. The normal vectors of each surface are within a normal surface, so that light incident upon the initial edge surface can be emitted from the light emission surface. A lighting device for an LCD panel using a polarization converter is also disclosed.

28 Claims, 16 Drawing Sheets

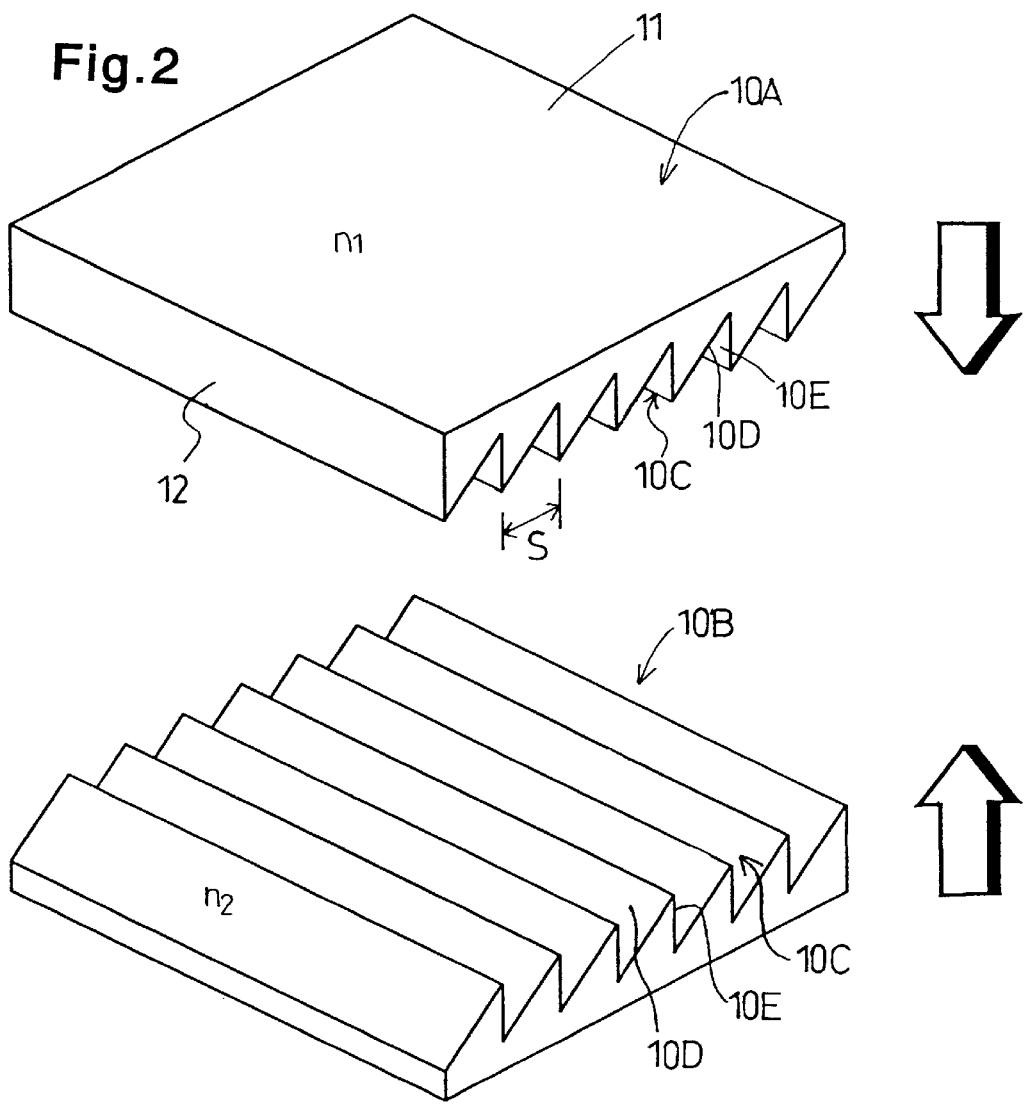
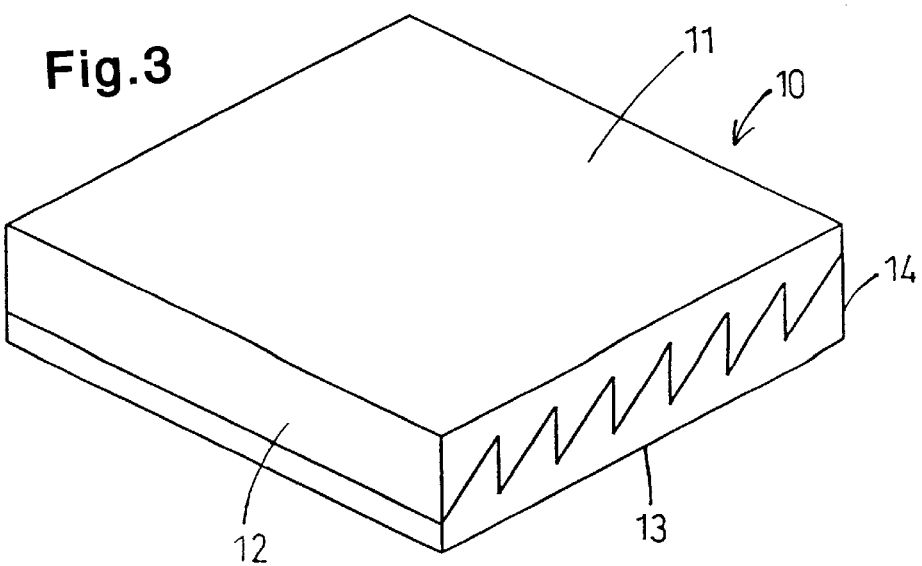

$\beta = \alpha + \Delta$

POLARIZATION CONVERTER AND LIGHTING DEVICE FOR LCD PANEL

BACKGROUND OF THE INVENTION

1. Field of the Invention

The present invention relates to a polarization converter which produces polarized light having an identical polarization direction, and to a lighting device for an LCD panel using the polarization converter.

2. Description of the Related Art

In a liquid crystal display in which a liquid crystal display element (LCD panel) must be illuminated with polarized light having an identical polarization direction (linearly polarized light), various kinds of polarization converters are used. In particular, an LCD panel for a notebook personal computer, a digital camera or a video camera is illuminated using a thin lighting device (backlight). In general, in a known backlight in which unpolarized light from a light source is transmitted through a wedge-shaped light guide element and is emitted outside from one surface thereof, a polarization converter is provided between the emission surface of the light guide element and the LCD panel. The polarization converter absorbs 100% of light of a specific polarization direction (oscillation direction) from unpolarized light, the oscillation direction thereof being random, and permits a polarized light component whose polarization direction is perpendicular to the specific polarization direction to pass therethrough. Therefore, there is an inevitable light energy loss of at least 50%.

SUMMARY OF THE INVENTION

It is an object of the present invention to provide a polarization converter in which the utilization efficiency of light energy can be enhanced, i.e., more than 50% of light energy being utilized; and also to provide a lighting device for an LCD panel using the polarization converter.

Another object of the present invention is to provide a polarization converter in which the light-quantity distribution can be made as uniform as possible, and to provide a lighting device for an LCD panel using the polarization converter.

According to an aspect of the present invention, there is provided a polarization converter having a planar light guide element, in which at least one of front and rear surfaces thereof defines a light emission surface and one end surface defines an initial edge surface for an unpolarized light source, the light from the unpolarized light source propagating in a principal guided-light direction within the planar light guide element so that light incident upon the initial edge surface can be emitted from the light emission surface; wherein at least one corrugated (wave-shaped, zigzag) reflection surface is provided within the light guide element; the corrugated reflection surface defining a plurality of reflection surfaces arranged in the principal light guide direction; the corrugated reflection surface is formed by at least two adjacent optical media having different refractive indexes, and wherein the corrugated reflection surface is formed so that normal vectors of each of the plurality of reflection surfaces are within a normal plane.

Preferably, the refractive indexes n of the optical media are both greater than 1 (N>1).

Preferably, the respective refractive indexes nα, nβ of each optical media satisfy the following equation:

$$|n\alpha - n\beta|/(n\alpha + n\beta) < 0.16.$$

Preferably, the reflection surfaces of the corrugated reflection surface includes externally-reflecting surfaces which reflect light therefrom, and emit the light from the light emission surface or emit the light from the rear surface; and internally-reflecting surfaces which reflect the light propagating through the light guide to thereby maintain the light reflected therefrom within the light guide element.

Preferably, the density of the externally-reflecting surfaces increases in a direction from the initial edge surface toward a final edge surface provided at the opposite end of the initial edge surface, and the density of the internally-reflecting surface decreases in a direction from the initial edge surface toward the final edge surface.

Preferably, the externally-reflecting surfaces of the corrugated reflection surface include first oblique portions which reflect the light toward the light emission surface, and second oblique portions which reflect the light toward a rear surface which is a surface provided opposite to the light emission surface.

Preferably, the light guide element includes a reflection surface provided opposite to the light emission surface, which reflects the light emitted from the rear surface back into the light guide element.

Preferably, at least one of the optical media which constitutes the corrugated reflection surface includes an adhesive.

Preferably, at least two optical media that constitute the corrugated reflection surface are made of a pair of glass or plastic members which form the light guide element, and wherein the adhesive adheres the glass or plastic members together.

Preferably, at least two optical media that constitute the corrugated reflection surface are made of at least one synthetic resin film and an adhesive, held between a pair of glass or plastic members which form the light guide.

Preferably, the period s of the corrugated reflection surface is considerably larger than the wavelength λ of the unpolarized light introduced in the light guide element (s>λ).

The light guide element can include a reflection surface provided opposite to the final edge surface, which reflects the light emitted from the final edge surface back into the light guide element.

A quarter-wave plate can be further provided between the final edge surface of the light guide element and the reflection surface.

Alternatively, the inclination of the normals of first oblique portions of the corrugated reflection surface with respect to the principal guided-light direction are gradually varied so that the incident angle of the light upon the oblique portion is small on the initial edge surface side and increases in a direction towards the final edge surface.

Alternatively, the light guide element can be in the form of a wedge whose thickness decreases in a direction away from the initial edge surface toward the final edge surface.

Alternatively, the refractive index of the adhesive can gradually increase in a direction away from the initial edge surface toward the final edge surface.

The positional density of the first oblique portions of the corrugated reflection surface can increase in a direction away from the initial edge surface to the final edge surface.

Alternatively, the light guide element can be made of a birefringent substance.

Alternatively, the light guide element can be made of an optically active substance.

The final edge surface can be a roof mirror group which is opposite to the initial edge surface, the roof mirror group having ridges inclined at 45° with respect to a direction normal to the light emission surface.

Alternatively, a roof mirror group having ridges parallel with the light guide direction of the light guide element can be provided between the light emission surface of the light guide element and the surface opposite the light emission surface.

Preferably, the apex angle of the roof mirror group is 90°.

Preferably, the light guide element is provided with a pair of light guide members having mutually engageable depressions and projections that determine the direction of the corrugated reflection surface, at least one corrugated reflection surface being defined by the pair of light guide members and an adhesive layer provided between the mutually engageable depressions and projections of the light guide members to thereby adhere the light guide members together.

Alternatively, the light guide element can be provided with a pair of light guide members having mutually engageable depressions and projections that determine the direction of the corrugated reflection surface, the at least one corrugated reflection surface being defined by a synthetic resin film and an adhesive layer, provided between the mutually engageable depressions and projections of the light guide elements.

Preferably, the synthetic resin film and the adhesive are included as a plurality of layers thereof.

Preferably, the number of the synthetic resin film layers increases in a direction away from the initial edge surface toward the final edge surface.

Preferably, the refractive index of the adhesive gradually increases in a direction away from the initial edge surface toward the final edge surface.

Preferably, an unpolarized light source is included at the initial edge surface, wherein the light emission surface is opposed to the LCD panel.

The present disclosure relates to subject matter contained in Japanese Patent Application No. 10-166972 (filed on Jun. 15, 1998) which is expressly incorporated herein by reference in its entirety.

BRIEF DESCRIPTION OF THE DRAWINGS

The invention will be described below in detail with reference to the accompanying drawings, in which;

FIG. 2 is a perspective view of a pair of transparent elements in a principle model of a surface emitter according to the present invention;

FIG. 3 is a perspective view of a pair of connected transparent elements;

DESCRIPTION OF THE PREFERRED EMBODIMENT

Figure 1:
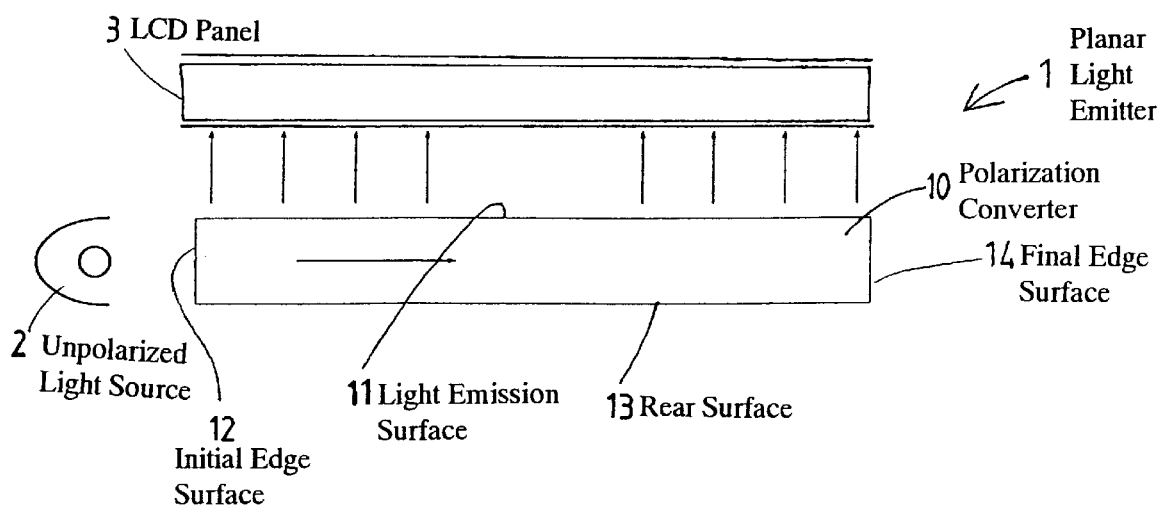
FIG. 1 is a conceptual sectional view of a planar light emitter (surface emitter) using a light polarizing element (polarization converter)

FIG. 1 schematically shows a planar light emitter 1 using a polarization converter 10 according to the present embodiment. The polarization converter 10 is generally in the form of a flat rectangular plate whose one surface (upper surface in FIG. 1) defines a light emission surface 11. One (left surface in FIG. 1) of the lateral side surfaces (end surfaces) of the planar polarization converter 10 defines an initial edge surface 12. The initial edge surface 12 is opposed to an unpolarized light source 2, and an LCD panel 3 is located above the light emission surface 11. According to one of the significant features of the present embodiment, the polarized light beams having an identical polarization direction are emitted directly from the light emission surface 11 of the polarization converter 10. In the planar light emitter 1 using the polarization converter 10, a specifically polarized light (linearly polarized light) can be made incident upon the LCD panel 3 without providing a polarizing element between the light emission surface 11 of the polarization converter 10 and the LCD panel 3. The surface of the polarization converter 10 opposite to the light emission surface 11 is referred to as a rear surface 13, and the side surface opposite to the initial edge surface 12 is referred to as a final edge surface 14.

Figure 4:
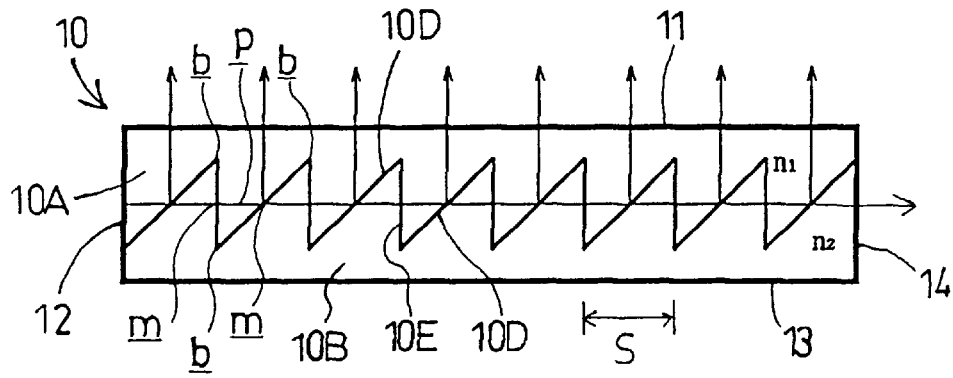
FIG. 4 is a schematic sectional view of a pair of transparent elements shown in FIG. 3, to explain reflection and transmission of light.

FIGS. 2, 3 and 4 schematically show a first embodiment of the polarization converter 10. The polarization converter 10 is composed of two substantially rectangular transparent plates 10A and 10B having different refractive indexes n1 and n2, respectively. The transparent plates 10A and 10B are provided on their opposed surfaces with mutually engageable depressions and projections 10C. The depressions and projections 10C form a corrugated (wave-shaped, zigzag) reflection surface when the transparent plates 10A and 10B are mutually engaged with each other. The corrugated reflection surface is composed of oblique surfaces (externally-reflecting surfaces) 10D, which are inclined so as to reflect light incident on the initial edge surface 12 towards the light emission surface 11, and transmission surfaces 10E are perpendicular with respect to a plane of the light emission surface 11. The transmission surfaces 10E are perpendicular to the light emission surface 11. The oblique surfaces 10D and the transmission surfaces 10E are alternately arranged.

Light incident upon the polarization converter 10 at the initial edge surface 12 passes alternately through the transparent plates 10A and 10B, is partly reflected by the oblique surfaces (externally-reflecting surfaces) 10D and the remaining light is transmitted through the transmission surfaces 10E. A portion of the light incident on the transmission surfaces 10E reflects back toward the oblique surfaces 10D, to thereby be reflected toward the rear surface 13 by the oblique surfaces 10D. The remaining portion of the light incident on the transmission surfaces 10E transmits therethrough. In other words, the transmission surfaces 10E also function as internally-reflecting surfaces which keep light reflected by the transmission surfaces 10E within the polarization converter 10. Conversely, the reflection surfaces 10D can be referred to as externally-reflecting surfaces. The inclination direction of the oblique surfaces (externally-reflecting surfaces) 10D is set so that the light reflected thereby emits from the emission surface 11.

As shown in FIGS. 2 through 4, the inclination angles of the reflection surfaces are approximately 45 degrees with respect to the light emission surface 11, so that the light is emitted in a direction substantially normal to the light emission surface 11. The corrugated reflection surfaces which include the oblique surfaces (externally-reflecting surfaces) 10D and the transmission surfaces 10E, are bent so that the normal vectors of each surface portion in the same section plane form a single plane (normal plane). A connecting surface which connects mid-points m (in the same sectional plane parallel to the page of FIG. 4), with respect to a direction normal to the light emission surface 11, of the adjacent bending points b between the oblique surface 10D and the transmission surface 10E defines a substantial plane p which is substantially parallel to the light emission surface 11.

Figure 5:
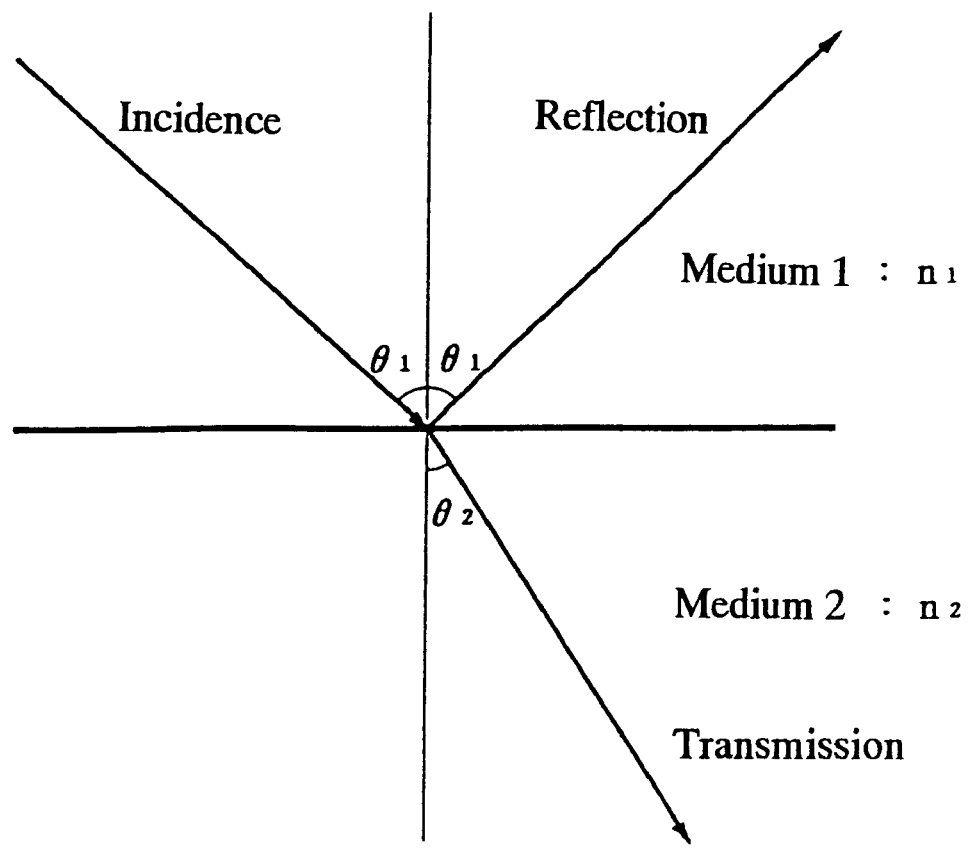
FIG. 5 is an explanatory view of the laws of reflection, transmission of light, and the Brewster's angle.

The relationship between the refractive indexes n1 and n2 of the materials located both sides of the corrugated reflection surface (the transparent plates 10A and 10B in the first embodiment) and the polarization will be explained below. FIG. 5 shows reflection light and transmission light at an interface (phase boundary) between a first medium of refractive index n1 and a second medium of refractive index n2 when light passing through the first medium is incident upon the second medium at an incident angle θ1. As is well known in the art, the incident angle θ1 which is equal to $\tan^{-1}(n2/n1)$ is referred to as the Brewster's angle θB (θB $\tan^{-1}(n2/n1)$), and when the incident angle θ1 is equal to the Brewster's angle θB, 100% of P-polarized light passes therethrough and S-polarized light is partly reflected. When n1=1 and n2=1.5, θB is 56.3°.

Figure 6:
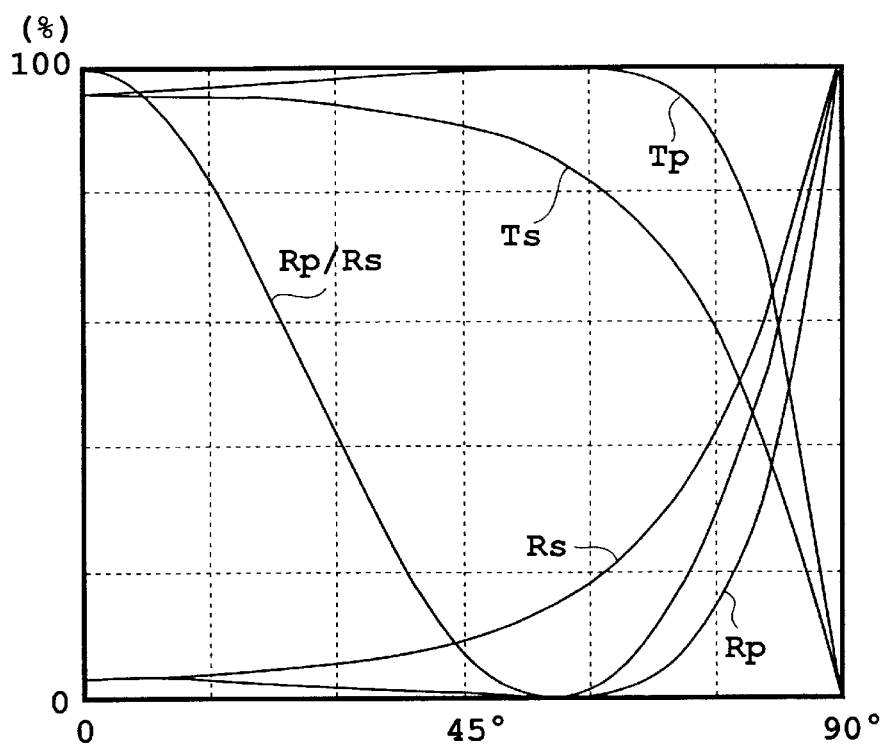
FIG. 6 is a graph showing the Brewster's angle and reflectance and transmittance of S-polarized light and P-polarized light when refractive indexes of two adjacent optical media are 1 and 1.5, respectively.

FIG. 6 shows reflectance Rp and transmittance Tp of the P-polarized light, reflectance Rs and transmittance Ts of the S-polarized light, and Rp/Rs, at the boundary for each incident angle when n1=1 and n2=1.5. At the Brewster's angle, Rs is approximately 15%. Therefore, if the inclination angle of the oblique surface (externally-reflecting surface) 10D is set so that the incident angle of light upon the oblique surface (externally-reflecting surface) 10D is identical to the Brewster's angle, it is possible to emit only S-polarized light from the emission surface 11.

Figure 7:
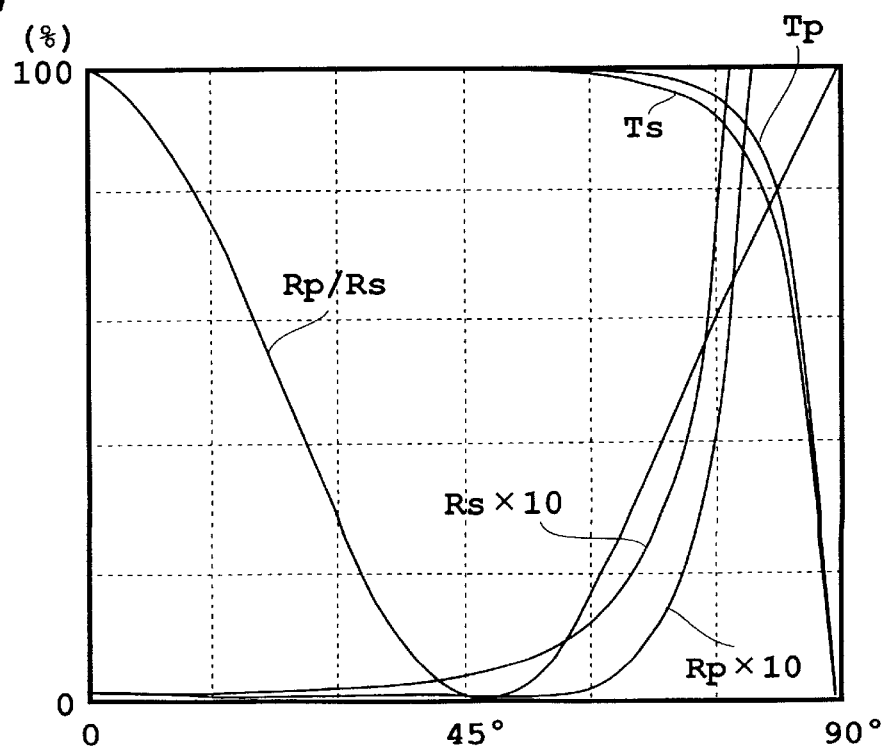
FIG. 7 is a graph showing the Brewster's angle and reflectance and transmittance of S-polarized light and P-polarized light when refractive indexes of two adjacent optical media are 1.5 and 1.6, respectively.

In order to more effectively supply the S-polarized light emitted from the emission surface 11 of the polarization converter 10 to the LCD panel 3; i.e., in order to emit the S-polarized light in the direction substantially perpendicular to the emission surface 11, it is preferable that the Brewster's angle θB be approximately 45°. If the value of n1 approaches the value of n2, the Brewster's angle θB approaches 45°. For example, when n1=1.5 and n2=1.6, θB=46.8°. FIG. 7 shows the reflectance Rp and transmittance Tp of the P-polarized light, reflectance Rs and transmittance Ts of the S-polarized light, and Rp/Rs, at the boundary for each incident angle when n1=1.5 and n2=1.6.

Since the values of Rs and Rp are small, the Rs and Rp in FIG. 7 are exaggerated ten times. At the Brewster's angle, Rs is approximately 0.3%. Since the value of Rs is small, it is possible to provide a larger number of oblique surfaces (reflection surfaces) 10D. Consequently, it is possible to emit only the S-polarized light from a larger surface area of the light emission surface 11. Moreover, the incident angle is approximately 45°, it is possible to emit the S-polarized light in a direction substantially perpendicular to the emission surface 11.

To emit the S-polarized light from the light emission surface 11, it is preferable that the refractive indexes n1 and n2 of the two optical media satisfy n1>1 and n2>1, i.e., none of the two optical media are air, and $$|n1-n2|/(n1+n2)<0.16 \qquad (1)$$

In the first embodiment, the value of equation (1) is 0.03, since n1=1.5 and n2=1.6.

Figure 8:
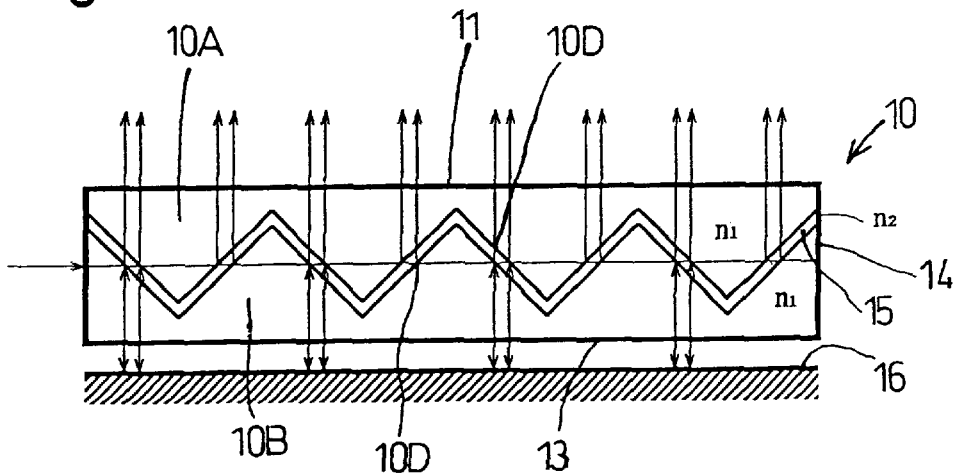
FIG. 8 is a schematic sectional view of a pair of transparent elements corresponding to FIG. 4, in a polarization converter according to another embodiment of the invention.

FIG. 8 shows a second embodiment of the polarization converter 10 according to the present invention. In FIG. 8, a number of the depressions and projections which are symmetrically inclined at approximately 45° with respect to the normal line to the light emission surface 11 are provided on the opposed surfaces of the transparent members 10A and 10B having an identical refractive index n1. The transparent members 10A and 10B engage with each other by an adhesive 15 whose refractive index is n2, provided between the depressions and projections thereof. In this embodiment, the corrugated reflection surfaces are formed between the transparent member 10A and the adhesive 15, and the adhesive 15 and the transparent member 10B. Consequently, the number of the reflection surfaces can be increased. Moreover, by selecting the refractive index of the adhesive 15, the reflection surfaces wherein the incident angle thereof approaches the Brewster's angle is easily attained.

In the present embodiment, the corrugated reflection surface functions as an externally-reflecting surface for reflecting the light outside the polarization converter 10. Namely, the corrugated reflection surface is composed of first oblique (externally-reflecting) portions 10D' which reflect light toward the light emission surface 11, and second oblique (externally-reflecting) portions 10D" which reflect light toward the rear surface 13; the oblique surfaces 10D' and 10D" being arranged alternatively. There is provided a reflection surface (reflection mirror) 16 opposed to the rear surface 13 to reflect the light emitted outward from the rear surface 13 of the polarization converter toward the polarization converter 10. Light reflected by the second oblique surfaces 10D", reflected by reflection mirror 16 and again entered in the polarization converter 10 is almost entirely composed of the S-polarized light component, and the remainder thereof (about 0.3% when n1=1.5 and n2=1.6) is reflected toward the initial edge surface 12 by the second reflection surface 10D". Almost all of the remaining light incident upon the second reflection surface 10D" passes through the same, and is emitted from the light emission surface 11.

Figure 9:
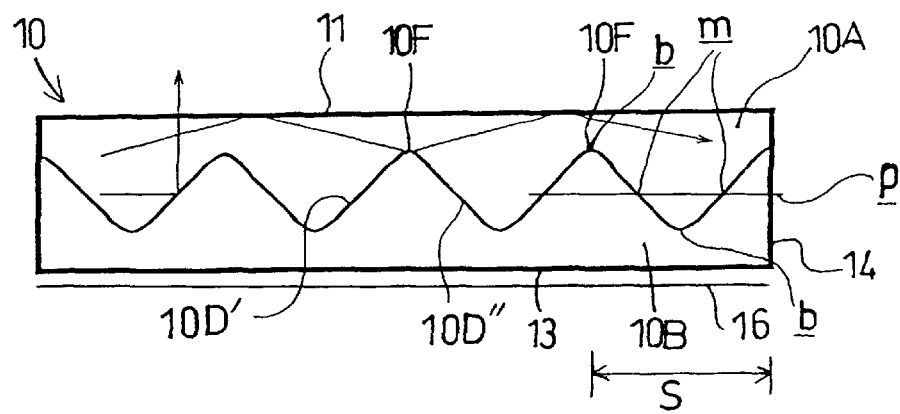
FIG. 9 is a schematic sectional view of a pair of transparent elements corresponding to FIG. 4, in a polarization converter according to another embodiment of the invention.

Although the adjacent oblique portions 10D' and 10D" of the corrugated reflection surface are provided with sharp-angled ridges in the embodiment shown in FIG. 8, the ridges are likely to be, in practice, rounded as shown in FIG. 9 when the transparent plates 10A and 10B are machined. In this case, each oblique portion 10D' and 10D" serve as externally-reflecting surfaces, whereas the rounded ridges 10F which reflect light entirely off the internal surface of the light emission surface 11, and do not emit externally. Namely, the rounded ridges 10F function as internally-reflecting surfaces which keep the light inside the polarization converter 10. Accordingly, the internally-reflecting surfaces 10F may be advantageously utilized to provide a polarization converter which has a large light emission area. Note that the adhesive 15 has been omitted in FIG. 9.

Figure 10:
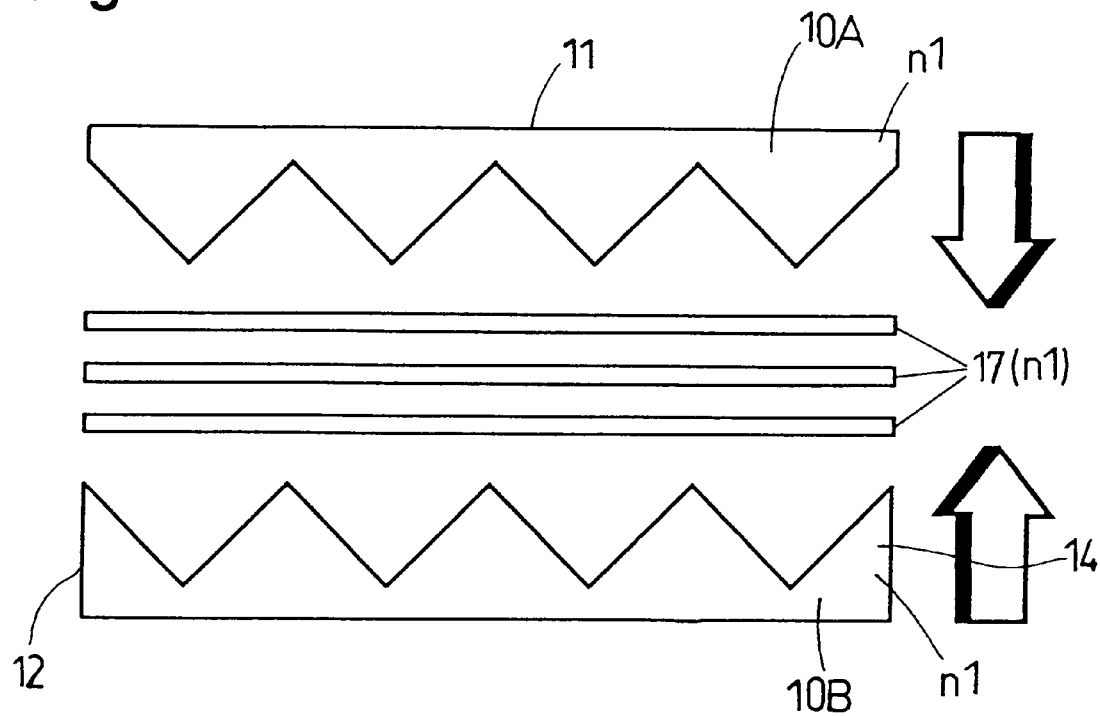
FIG. 10 is an exploded schematic sectional view of a pair of transparent elements and a film, in a polarization converter according to another embodiment of the invention.
Figure 11:
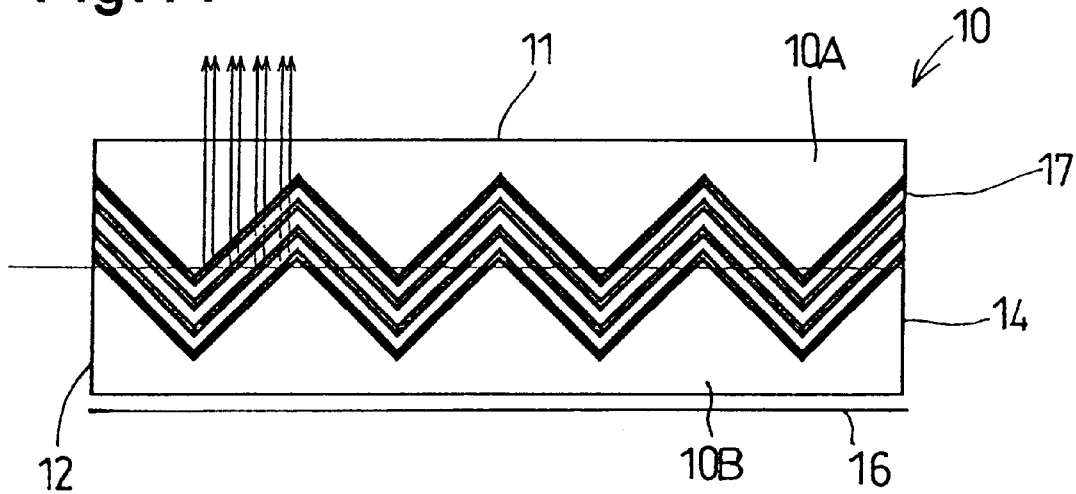
FIG. 11 is a sectional view of a pair of transparent elements and a film connected thereto.

FIGS. 10 and 11 show a third embodiment in which the quantity of S-polarized light to be emitted from the light emission surface 11 can be controlled. The size of the LCD panel (the length thereof in the guided light direction) is in the range from a few inches (for a digital camera) to more than ten inches (for a notebook personal computer). Accordingly, in the lighting device of the LCD, the light asses in the light guide path whose length is approximately in the range form a few centimeters to 20 centimeters. If the light emitting area of the polarization converter 10 is large, the light emission quantity per unit area from the light emission surface 11 should be relatively small in order to emit light uniformly until the final edge surface 14 in the direction of the guided-light by a pre-determined quantity of light. Whereas, if the light emitting area is small, light emission quantity per unit area should be relatively large to avoid optical energy loss. Therefore, it is preferable to control the quantity of light to be reflected. To this end, in the embodiment shown in FIGS. 10 and 11, m thin synthetic resin films (sheets) 17 whose refractive index is substantially identical to the refractive index nl of the transparent plates 10A and 10B, are provided between the transparent plates 10A and 10B and are adhered to each other and to the transparent plates by means of adhesive layers 15, having a refractive index n2. Consequently, the number of corrugated reflection surfaces (number of reflections) is increased to (m+1), and thus, the quantity of light to be emitted from the light emission surface 11 can be controlled by selecting an appropriate number of synthetic resin films 17.

Figure 12:
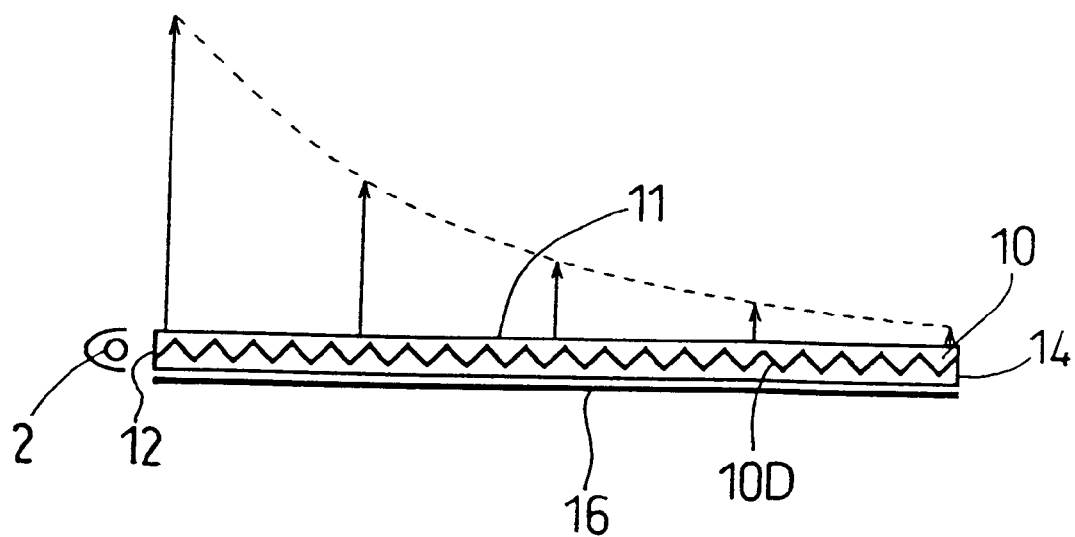
FIG. 12 is a graph showing a light-quantity distribution of a polarization converter according to an embodiment of the present invention, by way of example.

In the embodiments mentioned above, the unpolarized light beams incident upon the initial edge surface 12 of the polarization converter 10 are successively propagated to the final edge surface 14 through the reflection surfaces 10D which partly reflect the S-polarized light. Since the optical energy loss occurs at each reflection during the propagation in the polarization converter 10, the optical energy of the propagated light is exponentially reduced toward the final edge surface 14 (FIG. 12).

FIGS. 13 through 20 show embodiments to obtain a uniform light quantity distribution. In the following embodiments, although the corrugated reflection surface is indicated by a single solid line or two solid lines, it should be noted that the corrugated reflection surface shown in the above mentioned embodiments shown in FIGS. 8 through 11 can be utilized.

Figure 13:
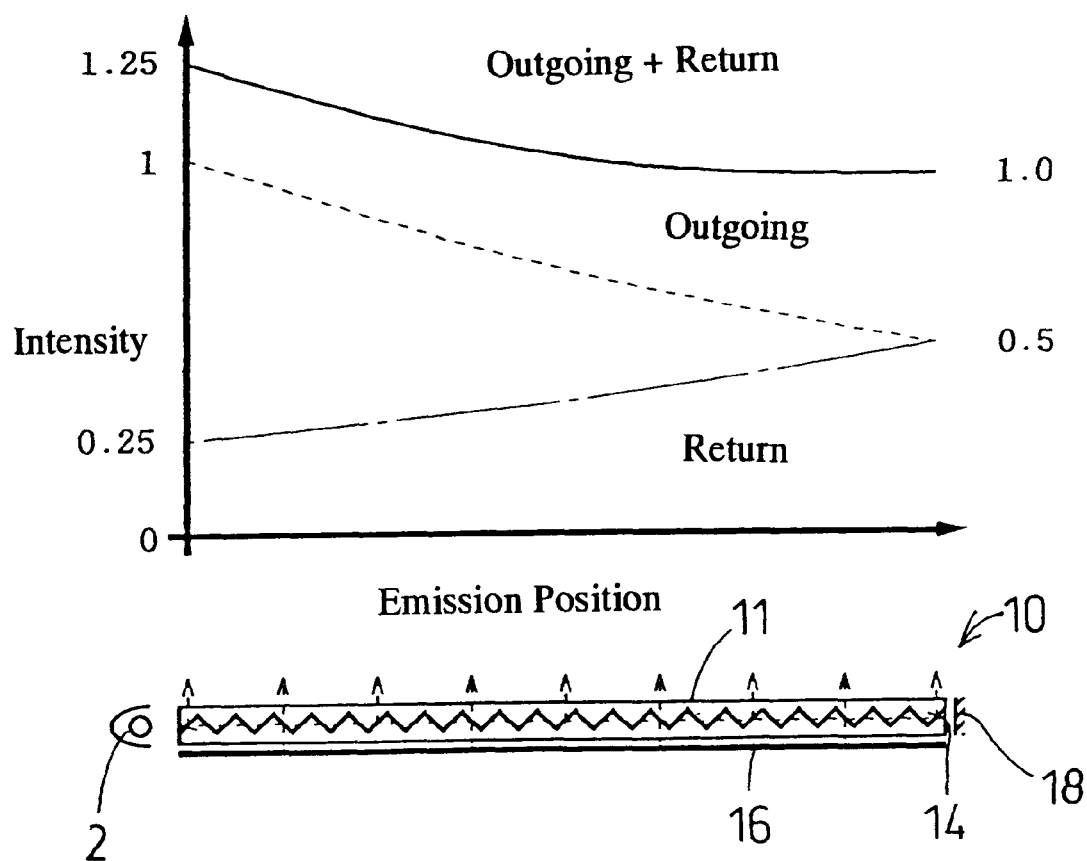
FIG. 13 is a graph showing an improved light-quantity distribution of a polarization converter according to another embodiment of the present invention.

In a fourth embodiment illustrated in FIG. 13, a reflection surface (mirror) 18 is adjacent to the final edge surface 14 of the polarization converter 10 to reflect the light emitted from the final edge surface 14 back toward the polarization converter 10. Assuming that 75% of the light incident upon the polarization converter 10 through the initial edge surface 12 is to be emitted from the emission surface 11 as S-polarized light, the reflectance of the polarization converter 10 is set (number of the reflection surfaces of the corrugated reflection surface, and reflectance of S-polarized light are set) so that the optical energy which is 1.0 at the initial edge surface 12 is reduced to 0.5 at the final edge surface 14. Consequently, both the outgoing light incident upon the initial edge surface 12, which travels toward the final edge surface 14, and is reflected by the first oblique portions 10D' of the corrugated refection surface and the return light travelling from the final edge surface 14 toward the initial edge surface 12 and reflected by the second oblique portions 10D" are overlapped and emitted from the light emission surface 11. Namely, the optical energy at the initial edge surface 12 is 1.25, and the optical energy at the final edge surface 14 is 1.00. Thus, a substantially uniform light quantity distribution recognized as being uniform by the naked eye can be obtained.

Figure 14:
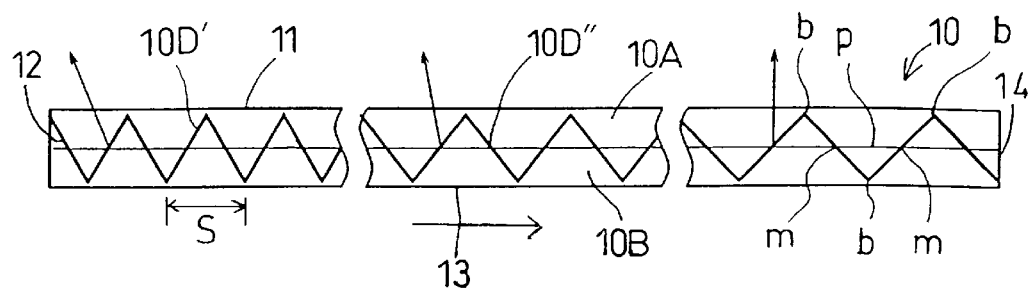
FIG. 14 is a schematic sectional view showing an improved light-quantity distribution of a polarization converter according to another embodiment of the present invention.

In a fifth embodiment shown in FIG. 14, the inclination angle of the first and second oblique portions 10D' and 10D" with respect to the principal guided-light direction varies from the initial edge surface 12 toward the final edge surface 14, to obtain a uniform light quantity distribution. As explained above with reference to FIGS. 6 and 7, if the incident angle of light on the reflection surface is identical to the Brewster's angle, all of the reflected light is S-polarized light and P-polarized light is totally transmitted. Moreover, the reflectance of the S-polarized light increases as the incident angle increases. In view of the foregoing, in this embodiment, the inclination angles of the first oblique portions 10D', with respect to the direction of the principal guided light, are gradually varied so that the incident angle of light upon the first oblique surfaces 10D' adjacent the initial edge surface 12 is smaller than the Brewster's angle, and is gradually increased toward the final edge surface 14 so that the final edge surface 14 is larger than the Brewster's angle.

Since the non-polarized light beam from the light source 2 has a certain emitting angle, the light beams propagate through the polarization converter 10 at different angles with respect to the direction of the principal guided light. The angle of a certain light beam with respect to the direction of the principal guided light is referred to as the light guide angle.

If it is assumed that n1=1.50, n2=1.60, and the light guide angle is 25°, the average reflectance of the light within this angle in connection with each reflection surface angle (the angle defined by the normal of the corrugated reflection surface and the principal guided-light direction) varies as shown in Table 1. From this Table, it can be found that a change from 35° to 55° (which is ±10° with respect to a 45° angle) in the angle of the first oblique portions 10D' causes the reflectance of S-polarized light to change by approximately 7 times.

TABLE 1

| Angle of Reflection Surfaces (°) | Rs (%) | Rp (%) |
|---|---|---|
| 35 | 0.33 | 0.05 |
| 40 | 0.47 | 0.08 |
| 45 | 0.74 | 0.18 |
| 50 | 1.27 | 0.46 |
| 55 | 2.39 | 1.24 |

Figure 15:
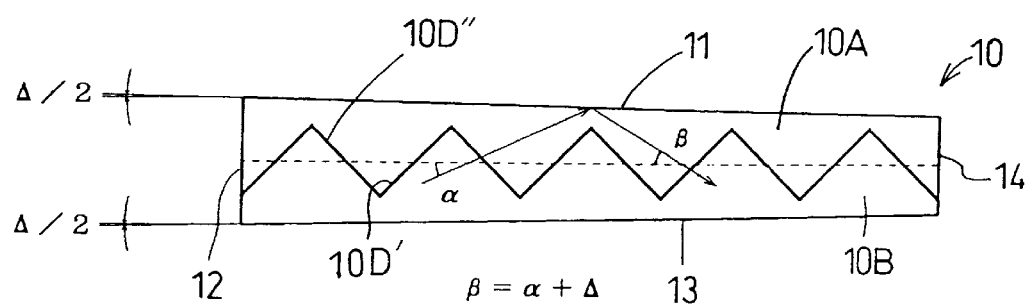
FIG. 15 is a schematic sectional view showing an improved light-quantity distribution of a polarization converter according to another embodiment of the present invention.

In a sixth embodiment shown in FIG. 15, the light emission surface 11 and the rear surface 13 defines a wedge shape of an angle Δ, so that the thickness of the polarization converter 10 is gradually decreased from the initial edge surface 12 toward the final edge surface 14 to obtain a uniform light quantity distribution. If the reflection surface angle of each oblique portions 10D' and 10D" of the corrugated reflection surface is identical, the light incident upon an oblique portion of the corrugated reflection surface at a light guide angle α, and reflected by the emission surface 11 or the rear surface 13, is incident upon the subsequent oblique portion at an incident angle (light guide angle) β which is defined by β=α+Δ. Namely, the light guide angle is increased by an angle Δ (which is identical to the wedge angle) for each reflection by the light emission surface 11 or the rear surface 13. As mentioned above, if the incident angle is small, the reflectance of the S-polarized light is small; or conversely, if the incident angle is large, the reflectance of the S-polarized light is large. Therefore, the wedge-shape of the polarization converter (light guide element) 10 contributes to an enhancement of the uniformity of the light quantity distribution. For example, if the reflection surface angle and the light guide angle are 45° and 25°, respectively, one of the two following cases a) or b) concerning the incident angle has a 50% probability of being true:

a)
Reflection Surface Angle+Light guide Angle=45°+25°=70°;
b)
Reflection Surface Angle−Light guide Angle=45°−25°=20°.

As shown in FIG. 7, since the increase of the reflectance due to an increase in the incident angle is greater than the decrease of the reflectance due to a decrease in the incident angle (by the same amount as the above-mentioned increase in the incident angle), the average reflectance of the S-polarized light is increased from the initial edge surface 12 toward the final edge surface 14. Accordingly, it is possible to keep the light distribution of the light emission surface 11 constant by compensating the decrease in the quantity of light occurred in the polarization converter 10.

If n1=1.50, n2=1.60, and the reflection surface angle is 45°, the mean reflectance of light in the light guide angle range is varied as shown in Table 2. From this Table, it can be understood that if the wedge angle Δ is set so that the light guide angle range at the initial edge surface 12 and at the final edge surface 14 are 15° and 35°, respectively, the reflectance of S-polarized light can be changed by approximately 4 times.

TABLE 2

| Light Guide Angle Range (°) | Rs (%) | Rp (%) |
|---|---|---|
| ±15 | 0.47 | 0.04 |
| ±20 | 0.57 | 0.08 |
| ±25 | 0.74 | 0.18 |
| ±30 | 1.08 | 0.40 |
| ±35 | 1.75 | 0.91 |

Figure 16:
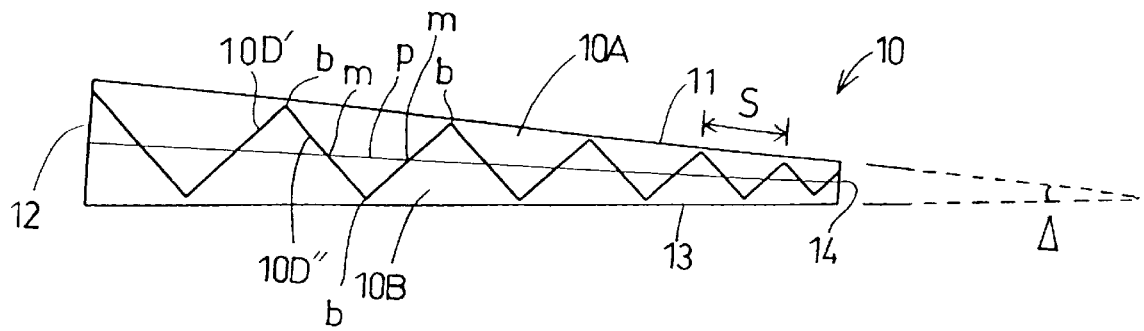
FIG. 16 is a schematic sectional view of a polarization converter having an improved light-quantity distribution, according to another embodiment of the invention.

FIG. 16 shows an example of the wedge shape of the polarization converter 10 in which the externally-reflecting surfaces 10D of the corrugated reflection surface have different depths and pitches. If the pitch of the reflection surface is successively made smaller from the initial edge surface 12 toward the final edge surface 14, the number of splitter surfaces for the light propagating within the polarization converter to transmit through (or reflect off) increases, whereby the total quantity of reflection light is increased.

Figure 17:
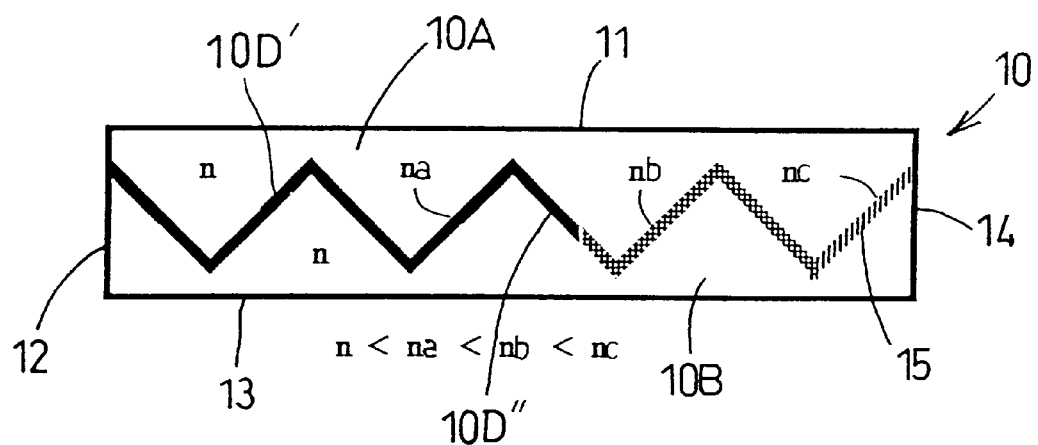
FIG. 17 is a schematic sectional view of a polarization converter having an improved light-quantity distribution, according to another embodiment of the invention.

FIG. 17 shows a seventh embodiment in which the light quantity distribution is improved by varying the refractive index of an adhesive 15. The reflectance of S-polarized light is determined in accordance with the refractive index. For example, the reflectance R of S-polarized light incident at a right angle is defined by $$R=\{(n1-n2)/(n1+n2)\}^2$$

Therefore, the reflectance of S-polarized light increases as the difference in the refractive index between n1 and n2 increases. There is the same tendency, as described above, for the light incident at an incident angle to be other than a right angle, though the formula of the reflectance is more complex. Therefore, assuming that the refractive index of the adhesive 15 is greater than the refractive index n of the transparent plates 10A and 10B (or synthetic resin sheet 17), the light quantity distribution can be improved by gradually increasing the refractive index of the adhesive 15 toward the final edge surface 14 from the initial edge surface 12. In FIG. 17, if the adhesive 15 has different refractive indexes na, nb, nc, which change toward the final edge surface 14 from the initial edge surface 12, the refractive indexes of the adhesive 15 are selected as follows:

$$n<na<nb<nc$$

The refractive index of the adhesive 15 which is generally used is 1.5 through 1.6. If adhesives having different refractive indexes are mixed, an intermediate refractive index can be obtained.

Figure 18:
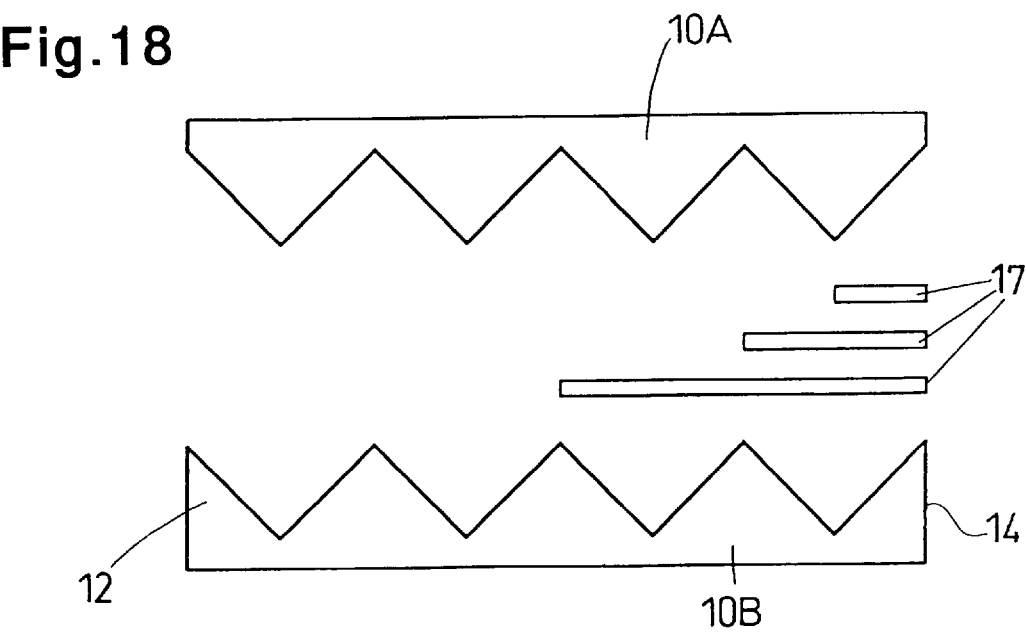
FIG. 18 is an exploded schematic sectional view of a pair of transparent elements and a film, in a polarization converter according to an embodiment of the invention in which the light-quantity distribution is improved.
Figure 19:
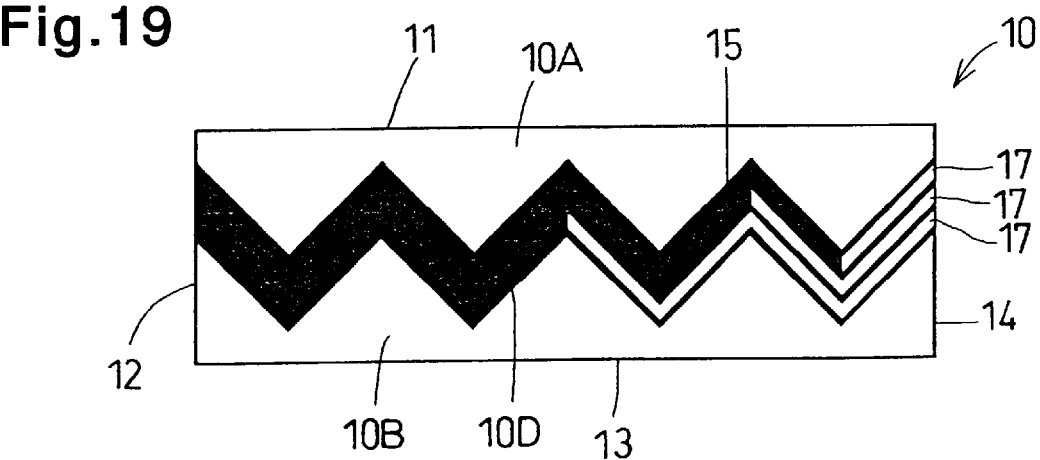
FIG. 19 is a schematic sectional view of a pair of transparent elements and a film connected thereto, shown in FIG. 18.

FIGS. 18 and 19 show a eighth embodiment of a polarization converter in which the light quantity distribution is improved by modifying the third embodiment (shown in FIGS. 10 and 11) in which the synthetic resin sheets 17 are used. In this embodiment, the number of the synthetic resin sheets 17 to be adhered between the transparent plates 10A and 10B by the adhesive 15 is increased toward the final edge surface 14 from the initial edge surface 12, so that the number of the corrugated reflection surfaces is increased toward the final edge surface 14 from the initial edge surface 12. In this embodiment, since the number (density) of the corrugated reflection surfaces is increased toward the final edge surface 14 from the initial edge surface 12, the distribution of the quantity of light can be improved.

Figure 20:
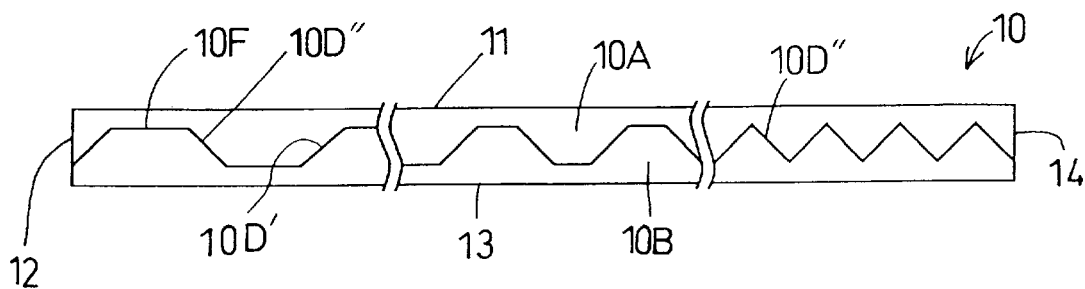
FIG. 20 is a schematic sectional view of a polarization converter having an improved light-quantity distribution, according to an embodiment of the invention.

FIG. 20 shows a ninth embodiment in which the internally-reflecting surface explained in FIG. 9 is utilized more distinctively. The corrugated reflection surface of the polarization converter 10 is provided therein with internally-reflecting surfaces 10F to reflect the light within the polarization converter 10, in addition to the externally-reflecting surface including the first and second oblique portions 10D' and 10D". Almost all the light reflected by the internally-reflecting surfaces 10F is totally reflected by the internal surface of the light emission surface 11 or the rear surface 13, and remains within the polarization converter 10. The density of the internally-reflecting surfaces 10F is high on the side of the initial edge surface 12 and is reduced toward the final edge surface 14. Conversely, the density of the externally-reflecting surfaces is low on the side of the initial edge surface 12 and is increased toward the final edge surface 14. The internally-reflecting surfaces 10F are shown as being substantially parallel with the light emission surface 11 and the rear surface 13; however, the surface shape of the internally-reflecting surfaces is not limited thereto, and can be of any shape which maintains the light within the polarization converter 10.

According to the embodiment shown in FIG. 20, not only can the pitch (density of the reflection surfaces) of the corrugated reflection surface be increased toward the final edge surface 14 from the initial edge surface 12, but also more optical energy can be remained within the polarization converter 10 on the initial edge surface 12 side than on the final edge surface 14 side due to the internally-reflecting surface 10F, and hence, the light quantity distribution can be improved.

In the embodiments mentioned above and illustrated in the drawings, in which S-polarized light can be emitted from the light emission surface 11, no discussion on P-polarized light which passes through the corrugated reflection surface has been given. To achieve a high utilization efficiency of the optical energy, and in particular, the utilization efficiency more than 50%, it is preferable to utilize the P-polarized light which passes through the corrugated reflection surface. FIGS. 21 through 29 show embodiments in which the P-polarized light is employed. In FIGS. 21 through 29, although the corrugated reflection surface is omitted or indicated by one or two solid lines, the embodiments shown therein are based on the corrugated reflection surface structures shown in FIGS. 1 through 11 or FIGS. 13 through 20.

Figure 21:
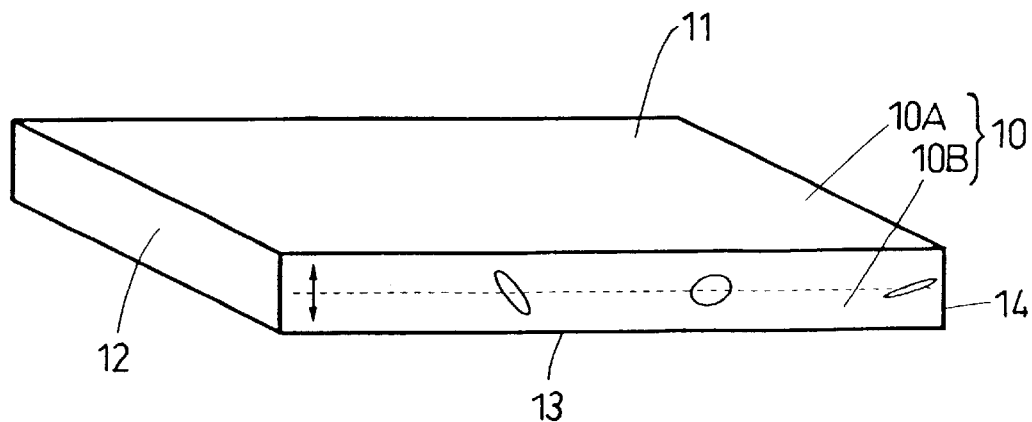
FIG. 21 is a perspective view of a polarization converter having an improved optical energy utilization efficiency, according to an embodiment of the invention.

FIG. 21 shows a tenth embodiment in which the transparent plates 10A and 10B of the polarization converter 10 are made of a birefringent material to enhance the utilization efficiency of P-polarized light. There are many plastics which exhibit birefringence. When polarized light is incident upon a birefringent medium, the polarization state changes during the propagation of the light in the medium. For instance, linearly polarized light is converted to elliptically polarized light, or the major axis direction of the elliptically polarized light changes, or the ellipticity changes. Therefore, if the transparent plates 10A and 10B (and/or the synthetic resin sheets 17) which constitute the polarization converter 10 are made of plastics which exhibit birefringence, the polarization state changes during the propagation. Consequently, it can be expected that the P-polarized light is converted to S-polarized light due to the change of the polarization state to supplement the quantity of S-polarized light which has been reduced. The straight line, circle and ellipse within the polarization converter 10 shown in FIG. 21 represent the corresponding polarization states during the propagation of light.

Figure 22:
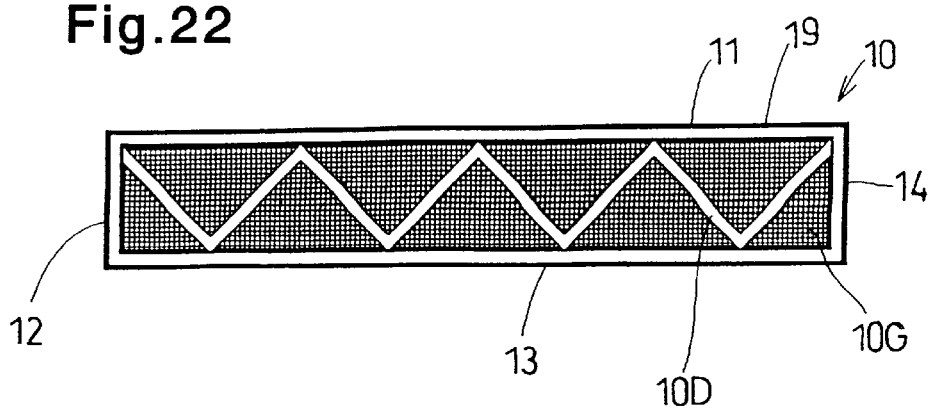
FIG. 22 is a schematic sectional view of a polarization converter having an improved optical energy utilization efficiency, according to another embodiment of the invention.

FIG. 22 shows an eleventh embodiment in which the transparent plates 10A and 10B which constitute the polarization converter 10 are made of an optically active substance 10G which has an optical rotatory power to improve the utilization efficiency of the P-polarized light. The optical rotation refers to a phenomenon wherein a plane of polarization rotates when the light passes through a substance. For example, a sucrose solution is an example of an optically active substance. When the light travels by 10 cm in a sucrose solution, in which 65 g of sucrose is contained in 100 g of total solution, the plane of polarization rotates by 43°. Consequently, the plane of polarization rotates by approximately 90° when the light travels by the distance identical to the lateral dimension of A-4 size sheet of paper (about 21 cm). Namely, during the propagation of the light by this distance, a conversion between P-polarized light and S-polarized light takes place. In this embodiment, the corrugated reflection surface is formed, for example, by bending and folding a film sheet, and the film sheet and the optically active substance 10G are enclosed within a cell 19 to form the polarization converter 10. Note that if the density of the sucrose solution is reduced, the optical rotation angle per a unit propagation distance is decreased, and hence the polarization converter 10 can be used as a lighting device for a larger LCD panel.

Figure 23:
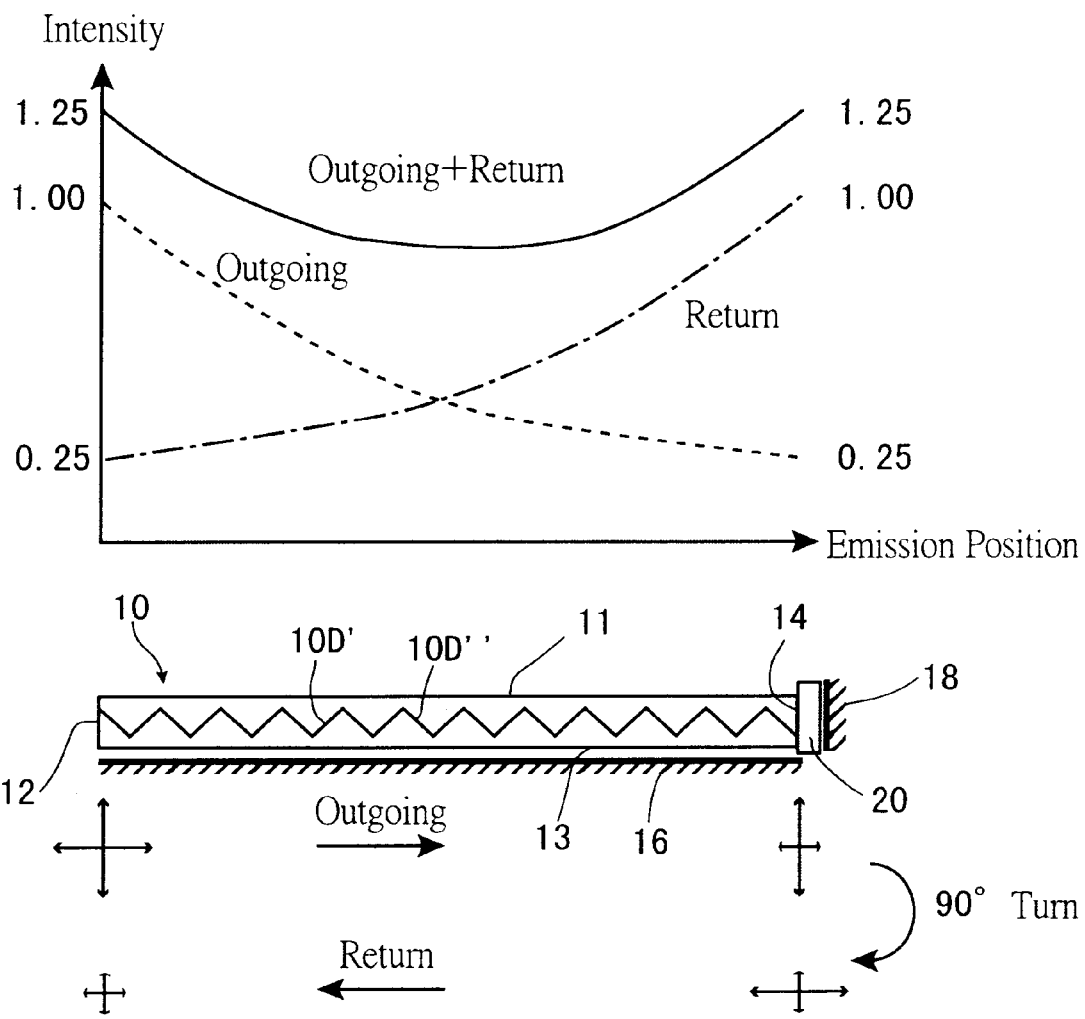
FIG. 23 is a schematic sectional view of a polarization converter having an improved optical energy utilization efficiency, according to another embodiment of the invention.

FIG. 23 shows a twelfth embodiment in which a quarter-wave plate (¼ λ plate) 20 is provided between the final edge surface 14 of the polarization converter 10 and the reflection surface (mirror) 18, shown in FIG. 13 to enhance the utilization efficiency of P-polarized light. Note that, in this embodiment, the reflection surfaces are set so that S-polarized optical energy of 1.0 at the initial edge surface 12 becomes 0.25 at the final edge surface 14. In this embodiment, light emitted from the final edge surface 14, reflected by the reflection surface (mirror) 18 and made incident again upon the polarization converter 10 passes through the ¼ λ plate 20 twice. Consequently, the polarization direction is rotated by 90°. Namely, a P-polarized light component is converted to an S-polarized light component and an S-polarized light component is converted to a P-polarized light component, respectively. Consequently, the P-polarized light component remaining in the outgoing path from the initial edge surface 12 toward the final edge surface 14 is converted to an S-polarized light component through the reflection surface (mirror) 18 and the ¼ λ plate 20 and is returned to the polarization converter 10. The S-polarized light component in the return path from the final edge surface 14 toward the initial edge surface 12 is reflected by the second oblique portions 10D" and then emitted from the emission surface 11, and is also transmitted through the second oblique portions 10D" to be reflected by the first oblique portions 10D' to the emission surface 11 and also to be reflected by the first oblique portions 10D' to the reflection surface (mirror) 16. The change in the polarization state is also shown in a lower part of FIG. 23.

Figure 24:
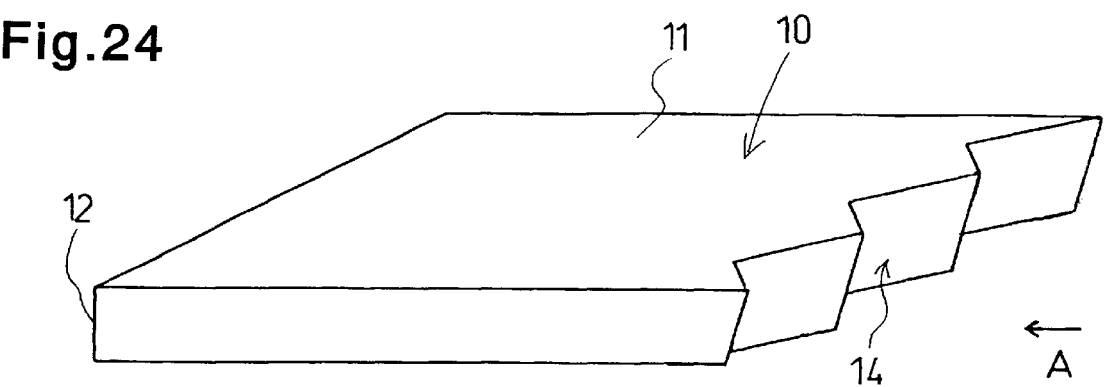
FIG. 24 is a perspective view of a polarization converter having an improved optical energy utilization efficiency, according to another embodiment of the invention.
Figure 25:
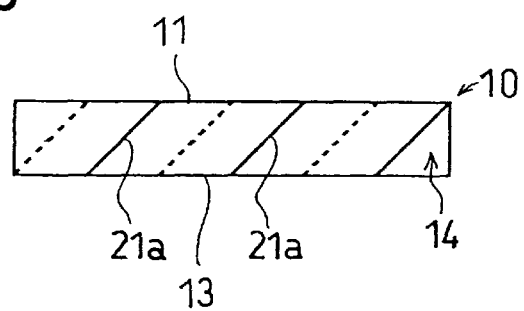
FIG. 25 is an end view viewed from an arrow A in FIG. 24.
Figure 26:
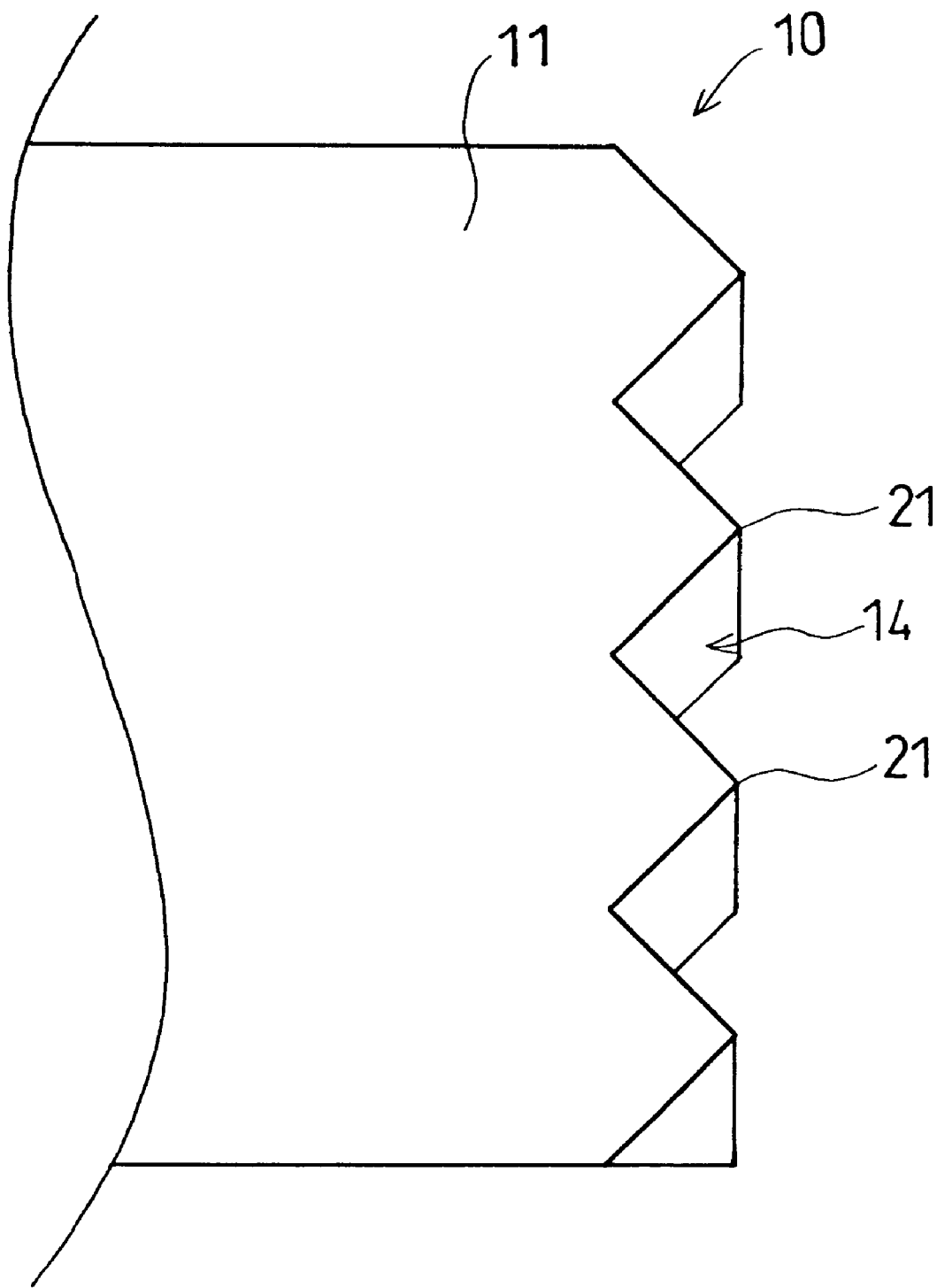
FIG. 26 is a plan view of FIG. 24.

FIGS. 24 through 26 show a thirteenth embodiment of a polarization converter 10. In this embodiment, a roof mirror group 21 is formed on the final edge surface 14 and is provided with ridges 21a which are inclined at 45° with respect to the normal direction of the light emission surface 11, to improve the utilization efficiency of P-polarized light. FIG. 25 is an end view of the polarization converter 10 when viewed in a direction A of FIG. 24 and FIG. 26 is a top plan view of FIG. 24. A roof mirror reflects light and inverts an image perpendicular to the ridge thereof. Therefore, the light incident on the roof mirror at a polarization direction of 45° with respect to the ridge is rotated by 90°. As shown in FIG. 25, if the group of ridges 21a are inclined at 45° with respect to the emission surface 11, the polarization direction of the P-polarized light, which passes through each oblique portion of the corrugated reflection surface with respect to the ridge 21a becomes 45°, and returns back into the polarization converter 10 upon reflection at the roof mirror 21 with the rotation of polarization direction by 90° thereby converted to S-polarized component light. Namely, roof mirror group 21 is equivalent to the quarter-wave plate (λ/4 plate) 20 shown in FIG. 23 and converts the polarization. The oblique lines indicated by solid lines in FIG. 25 represent the ridges 21a and the oblique lines indicated by dotted lines represent the bottom lines of the grooves defined between adjacent mirrors, respectively.

Figure 27:
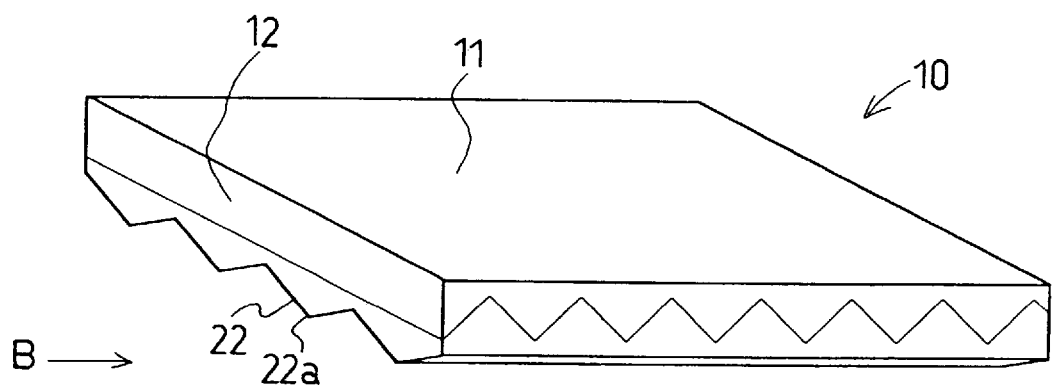
FIG. 27 is a perspective view of a polarization converter having an improved optical energy utilization efficiency, according to another embodiment of the invention.
Figure 28:
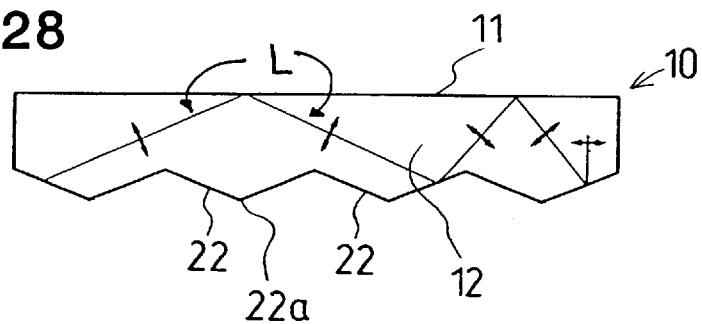
FIG. 28 is an end view viewed from an arrow B in FIG. 27.

FIGS. 27 and 28 show a fourteenth embodiment in which a roof mirror group 22 having ridges 22a parallel with the light guide direction is provided on the rear surface 13 of the polarization converter 10 to improve the utilization efficiency of P-polarized light. FIG. 28 is an end view of the polarization converter 10 when viewed in a direction B of FIG. 27. The surface normal to each surface of the roof mirror group 22 is perpendicular to the principal guided-light direction, as can be seen in FIG. 28. The apex angle of the roof mirror group 22 is larger than 90°. The line L in FIG. 28 represents a light beam propagating within the polarization converter 10. The arrows in FIG. 28 represent the oscillation direction of the light beam which changes through repetitive reflections by the emission surface 11 and the mirror group 22. The fact that the direction of the arrows considerably changes means that polarization direction of the light propagating in the polarization converter 10 is largely rotated by the repetitive reflections. Consequently, the P-polarized light component is converted to an S-polarized light component during the propagation thereof within the polarization converter 10, so as to supplement the reduced S-polarized light components, thus resulting in an enhanced utilization efficiency of the P-polarized light components.

Figure 29:
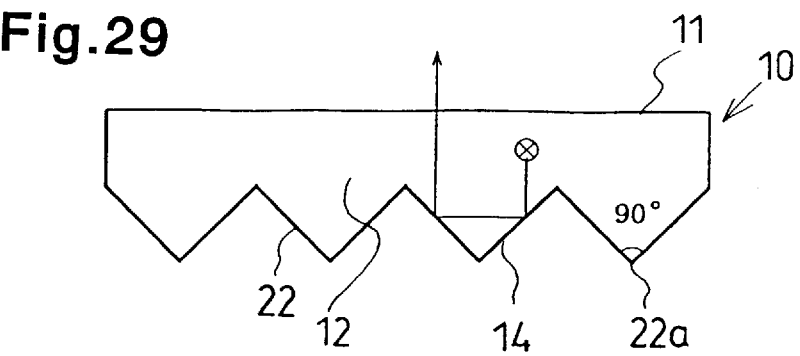
FIG. 29 is an end view corresponding to FIG. 28, showing a polarization converter having an improved optical energy utilization efficiency, according to another embodiment of the invention.

FIG. 29 shows a modified embodiment of the previous embodiment illustrated in FIGS. 27 and 28, in which the apex angle of the roof mirror group 22 is 90°. The thin line in FIG. 29 represents a light beam which is reflected by the corrugated reflection surface of the polarization converter 10 toward the final edge surface 14. In this embodiment, the P-polarized light component is converted to an S-polarized light component by the roof mirror group 22 whose apex angle is 90° and which is provided on the final edge surface 14. Moreover, the light reaching the rear surface 13 is returned toward the emission surface 11. The roof mirror group 22 serves also as a reflection surface (reflection mirror) 16 shown in FIG. 8.

In all of the embodiments described herein, the minimum pitch (distance) s of the corrugated reflection surface within the polarization converter 10 is considerably larger than the wavelength A of the unpolarized light propagating in the polarization converter 10 (s>>λ) so as not to cause diffraction. If diffraction occurs, an unexpected wavelength dependency may occur.

In a LCD for your average lap-top computer, a pitch (i.e., period ) of 0.1 mm is considered as being most preferable. In the case of the embodiments shown wherein the pitch alters, the alteration of pitch can occur within the range of 0.05~1 mm.

Note that, in all the embodiments mentioned above, the corrugated reflection surfaces which include the oblique surfaces 10D' (externally-reflecting surfaces) and 10D' (externally-reflecting surfaces), are bent so that the normal vectors of each surface portion in the same section plane form a single plane (normal plane), and that a connecting surface which connects mid-points m, with respect to a direction normal to the light emission surface 11, of the adjacent bending points b between the oblique surfaces 10D' and 10D" defines a substantial plane p.

The polarization converter of the present invention is not limited to the embodiments mentioned above and the invention can be applied to a combination of the embodiments.

As can be understood from the foregoing, according to the present invention, the polarized light having an identical polarization direction can be emitted directly from a light emission surface of an element corresponding to a conventional light guide for backlight without need for a separate polarizing element. Moreover, according to the present invention, a polarization converter in which at least 50% of optical energy is utilized can be obtained. Furthermore, a polarization converter in which the quantity distribution of the light emitted from the emission surface can be made as uniform as possible and a lighting device for an LCD panel can be provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A polarization converter having a planar light guide element, in which at least one of front and rear surfaces thereof defines a light emission surface and one end surface defines an initial edge surface for an unpolarized light source, the light from the unpolarized light source propagating away from said initial edge surface in a principal guided-light direction within said planar light guide element so that light incident upon the initial edge surface can be emitted from the light emission surface, wherein at least one corrugated reflection surface is provided within the light guide element;

said corrugated reflection surface defining a plurality of reflection surfaces arranged in the principal light guide direction;

said corrugated reflection surface is formed by at least two adjacent optical media having different refractive indexes, and wherein said corrugated reflection surface is formed so that normal vectors of each of said plurality of reflection surfaces are within a normal plane, said normal plane formed by said normal vectors of said each surface portion in the same sectional plane.

2. A polarization converter according to claim 1, wherein the refractive indexes n of the optical media are both greater than 1 (N>1).

3. A polarization converter according to claim 1, herein the respective refractive indexes nα, nβ of each aid optical media satisfy the following equation:

|nα−nβ|/(nα+nβ)<0.16.

4. A polarization converter according to claim 1, wherein the reflection surfaces of the corrugated reflection surface comprises externally-reflecting surfaces which reflect light therefrom, and emit the light from said light emission surface or emit the light from the rear surface; and internally-reflecting surfaces which reflect the light propagating through the light guide to thereby maintain the light reflected therefrom within the light guide element.

5. A polarization converter according to claim 4, wherein a density of the externally-reflecting surfaces increases in a direction from the initial edge surface toward a final edge surface provided at the opposite end of the initial edge surface, and a density of the internally-reflecting surface decreases in a direction from the initial edge surface toward the final edge surface.

6. A polarization converter according to claim 4, said externally-reflecting surfaces of said corrugated reflection surface comprise first oblique portions which reflect the light toward the light emission surface, and second oblique portions which reflect the light toward a rear surface which is a surface provided opposite to the light emission surface.

7. A polarization converter according to claim 1, wherein the light guide element comprises a reflection surface provided on the opposite side of the light emission surface, which reflects the light emitted from the rear surface back into the light guide element.

8. A polarization converter according to claim 1, wherein at least one of the optical media which constitutes the corrugated reflection surface comprises an adhesive.

9. A polarization converter according to claim 8, wherein at least two optical media that constitute the corrugated reflection surface are made of a pair of glass or plastic members which form the light guide element, and wherein said adhesive adheres the glass or plastic members together.

10. A polarization converter according to claim 8, wherein at least two optical media that constitute the corrugated reflection surface are made of at least one synthetic resin film and an adhesive, held between a pair of glass or plastic members which form the light guide.

11. A polarization converter according to claim 1, wherein the period s of the corrugated reflection surface is considerably larger than the wavelength λ of the unpolarized light introduced in the light guide element (s>>λ).

12. A polarization converter according to claim 1, wherein the light guide element comprises a reflection surface provided opposite to the final edge surface, which reflects the light emitted from the final edge surface back into the light guide element.

13. A polarization converter according to claim 12, further comprising a quarter-wave plate provided between the final edge surface of the light guide element and said reflection surface.

14. A polarization converter according to claim 6, wherein the inclination of the normals of first oblique portions of the corrugated reflection surface with respect to the principal guided-light direction are gradually varied so that the incident angle of the light upon the oblique portion is small on the initial edge surface side and increases in a direction towards the final edge surface.

15. A polarization converter according to claim 1, wherein the light guide element is in the form of a wedge whose thickness decreases in a direction away from the initial edge surface toward the final edge surface.

16. A polarization converter according to claim 8, wherein the refractive index of the adhesive gradually increases in a direction away from the initial edge surface toward the final edge surface.

17. A polarization converter according to claim 6, wherein the positional density of the first oblique portions of the corrugated reflection surface increases in a direction away from the initial edge surface to the final edge surface.

18. A polarization converter according to claim 1, wherein the light guide element is made of a birefringent substance.

19. A polarization converter according to claim 1, wherein the light guide element is made of an optically active substance.

20. A polarization converter according to claim 1, wherein said final edge surface comprises a roof mirror group which is opposite to the initial edge surface, said roof mirror group having ridges inclined at 45° with respect to a direction normal to the light emission surface.

21. A polarization converter according to claim 1, further comprising a roof mirror group having ridges parallel with the light guide direction of the light guide element between the light emission surface of the light guide element and the surface opposite the light emission surface.

22. A polarization converter according to claim 20, wherein the apex angle of the roof mirror group is 90°.

23. A polarization converter according to claim 1, wherein the light guide element is provided with a pair of light guide members having mutually engageable depressions and projections that determine the direction of the corrugated reflection surface, said at least one corrugated reflection surface being defined by said pair of light guide members and an adhesive layer provided between the mutually engageable depressions and projections of the light guide members to thereby adhere the light guide members together.

24. A polarization converter according to claim 1, wherein the light guide element is provided with a pair of light guide members having mutually engageable depressions and projections that determine the direction of the corrugated reflection surface, said at least one corrugated reflection surface being defined by a synthetic resin film and an adhesive layer, provided between the mutually engageable depressions and projections of the light guide elements.

25. A polarization converter according to claim 24, wherein the synthetic resin film and the adhesive are comprised as a plurality of layers thereof.

26. A polarization converter according to claim 25, wherein the number of the synthetic resin film layers increases in a direction away from the initial edge surface toward the final edge surface.

27. A polarization converter according to claim 23, wherein the refractive index of the adhesive gradually increases in a direction away from the initial edge surface toward the final edge surface.

28. A lighting device for an LCD panel using a polarization converter according to claim 1, comprising an unpolarized light source at the initial edge surface, wherein the light emission surface is opposed to the LCD panel.

* * * * *